US012562392B2

(12) United States Patent
Kim et al.

(10) Patent No.: US 12,562,392 B2
(45) Date of Patent: **\*Feb. 24, 2026**

(54) METHOD OF MONITORING AND REPLACING FUEL CELL STACKS WITHIN A FUEL CELL STACK ASSEMBLY

(71) Applicant: Robert Bosch GmbH, Stuttgart (DE)

(72) Inventors: Soo Kim, Cambridge, MA (US);
Nathan Craig, Santa Clara, CA (US);
Nikhil Ravi, Redwood City, CA (US);
Jake Christensen, Elk Grove, CA (US)

(73) Assignee: Robert Bosch GmbH, Stuttgart (DE)

( \* ) Notice: Subject to any disclaimer, the term of this patent is extended or adjusted under 35 U.S.C. 154(b) by 288 days.

This patent is subject to a terminal disclaimer.

(21) Appl. No.: 17/899,835

(22) Filed: Aug. 31, 2022

(65) Prior Publication Data

US 2022/0416264 A1 Dec. 29, 2022

Related U.S. Application Data

(62) Division of application No. 16/731,562, filed on Dec. 31, 2019, now Pat. No. 11,462,749.

(51) Int. Cl.
*H01M 8/0297* (2016.01)
*H01M 8/0206* (2016.01)
*H01M 8/0217* (2016.01)
*H01M 8/241* (2016.01)
*H01M 8/0432* (2016.01)
(Continued)

(52) U.S. Cl.
CPC ....... *H01M 8/0297* (2013.01); *H01M 8/0206* (2013.01); *H01M 8/0217* (2013.01); *H01M 8/241* (2013.01); *H01M 8/0432* (2013.01);

*H01M 8/04492* (2013.01); *H01M 8/04552* (2013.01); *H01M 8/04582* (2013.01);
(Continued)

(58) Field of Classification Search
None
See application file for complete search history.

(56) References Cited

U.S. PATENT DOCUMENTS 6,214,487 B1 \* 4/2001 Kelley ................. H01M 10/48
429/430
7,892,695 B2 2/2011 Kato
(Continued)

FOREIGN PATENT DOCUMENTS

WO 2000074165 A1 7/2000

*Primary Examiner* — Alix E Eggerding
(74) *Attorney, Agent, or Firm* — Brooks Kushman P.C.

(57) ABSTRACT

A method of monitoring and replacing fuel cells within a fuel cell stack assembly. The method includes measuring one or more operating conditions of a fuel cell within the fuel cell stack assembly. The method includes determining, using a processor, a state of health of the fuel cell based at least in part on the one or more operating conditions. The method includes detaching the fuel cell from an adjacent cell within the fuel cell stack assembly by removing a first electrically-conducing mating matrix associated with a first endplate of the fuel cell from a second electrically-conducing mating matrix associated with a second endplate of the adjacent cell. The method includes attaching a replacement fuel cell by mating a third electrically-conducing mating matrix associated with a third endplate of the replacement fuel cell with a fourth electrically-conducing mating matrix associated with a fourth endplate of the adjacent cell.

19 Claims, 6 Drawing Sheets

(51) Int. Cl.

| | |
|---|---|
| *H01M 8/04492* | (2016.01) |
| *H01M 8/04537* | (2016.01) |
| *H01M 8/04664* | (2016.01) |
| *H01M 8/10* | (2016.01) |

(52) U.S. Cl.
    CPC .... *H01M 8/04641* (2013.01); *H01M 8/04671*
                (2013.01); *H01M 2008/1095* (2013.01)

(56) References Cited

U.S. PATENT DOCUMENTS

| | | | |
|---|---|---|---|
| 10,312,699 B2 | 6/2019 | Subbaraman et al. | |
| 11,462,749 B2 * | 10/2022 | Kim .................... | H01M 8/0217 |
| 2003/0162080 A1 | 8/2003 | DeAngelis et al. | |
| 2005/0019642 A1 | 1/2005 | Hishitani et al. | |
| 2005/0095484 A1 | 5/2005 | Saulsbury et al. | |
| 2006/0263668 A1 | 11/2006 | Mikhail et al. | |
| 2010/0021785 A1 | 1/2010 | Son et al. | |
| 2018/0145365 A1 * | 5/2018 | Jin ..................... | H01M 8/2404 |

* cited by examiner

METHOD OF MONITORING AND REPLACING FUEL CELL STACKS WITHIN A FUEL CELL STACK ASSEMBLY

CROSS-REFERENCE TO RELATED APPLICATIONS

This application is a division of U.S. application Ser. No. 16/731,562, filed Dec. 31, 2019, now U.S. Pat. No. 11,462, 749 which issued on Oct. 4, 2022, which is hereby incorporated in reference in its entirety.

TECHNICAL FIELD

This disclosure is generally directed to a method of monitoring and replacing fuel cell stacks within a fuel cell stack assembly.

BACKGROUND

Fuel cells and, specifically, proton exchange membrane fuel cells (PEMFCs) hold great promise as high efficiency, high power density, relative light weight, and zero carbon emission energy sources for use in a wide variety of applications. Such applications include, but are not limited to, transportation, stationary power generation, and portable power generation. Particularly relevant to its automotive and other transportation-related applications, the PEMFC represents an environmentally-friendly alternative to internal combustion engines for a variety of vehicles. Due to rising carbon dioxide emissions and widespread dependency on non-renewable fossil fuels as energy carriers in the transportation sector, the development and commercialization of new transportation technologies, such as cost-efficient fuel cell vehicles (FCVs), have become increasingly-important industry goals.

Although increasing use of FCVs will lead to reduction of the world's carbon dioxide emissions, the PEMFC stack found inside FCVs requires additional technological development in order to support widespread commercialization of the technology. Accordingly, fuel cell technology is a highly-active research area today and many expect that a significant fuel cell economy will be a reality within approximately ten years. Such technological development is necessary to overcome drawbacks presently associated with known fuel cell designs. For example, commercially-available fuel cell catalyst materials are, today, typically made of expensive noble metals such as platinum and Pt-M alloys (M=Co, Ni, etc.). Additionally, existing fuel cell stack systems are mostly designed as "closed" systems, thereby complicating the prospects of cell-level maintenance, replacement, and subsequent recycling and recovery of precious metals. Thus, there is a need to address these and other design and operational inefficiencies associated with existing fuel cell configurations.

SUMMARY

In one embodiment, a method of monitoring and replacing fuel cells within a fuel cell stack assembly is disclosed. The method includes measuring, using one or more sensors in communication with a fuel cell monitoring system, one or more operating conditions of a fuel cell within the fuel cell stack assembly. The method further includes determining, using a processor, a state of health of the fuel cell based at least in part on the one or more operating conditions. The method also includes detaching the fuel cell from an adjacent cell within the fuel cell stack assembly by removing a first electrically-conducing mating matrix associated with a first endplate of the fuel cell from a second electrically-conducing mating matrix associated with a second endplate of the adjacent cell. The method also includes attaching a replacement fuel cell to the fuel cell stack assembly by mating a third electrically-conducing mating matrix associated with a third endplate of the replacement fuel cell with a fourth electrically-conducing mating matrix associated with a fourth endplate of the adjacent cell.

In another embodiment, a method of monitoring and replacing fuel cells within a fuel cell stack assembly is disclosed. The method includes measuring one or more operating conditions of a fuel cell within the fuel cell stack assembly. The method further includes determining a state of health of the fuel cell based at least in part on the one or more operating conditions. The method also includes detaching the fuel cell from an adjacent cell within the fuel cell stack assembly by removing a first electrically-conducing mating matrix associated with a first endplate of the fuel cell from a second electrically-conducing mating matrix associated with a second endplate of the adjacent cell. Elements of the first electrically-conducting mating matrix are positioned about an edge region of the first endplate and a middle region of the first endplate within the edge region of the first endplate. Elements of the second electrically-conducting mating matrix are positioned about an edge region of the second endplate and a middle region of the second endplate within the edge region of the second endplate. The method also includes attaching a replacement fuel cell to the fuel cell stack assembly by mating a third electrically-conducing mating matrix associated with a third endplate of the replacement fuel cell with a fourth electrically-conducing mating matrix associated with a fourth endplate of the adjacent cell. Elements of the third electrically-conducting mating matrix are positioned about an edge region of the third endplate and a middle region of the third endplate within the edge region of the third endplate. Elements of the fourth electrically-conducting mating matrix are positioned about an edge region of the fourth endplate and a middle region of the fourth endplate within the edge region of the fourth endplate.

According to yet another embodiment, a method of monitoring and replacing fuel cells within a fuel cell stack assembly is disclosed. The method may include measuring, using one or more sensors in communication with a fuel cell monitoring system, one or more operating conditions of a fuel cell within the fuel cell stack assembly. The method may further include determining, using a processor, a state of health of the fuel cell based at least in part on the one or more operating conditions and sending a notification regarding the state of health of the fuel cell to one or more recipients or recipient systems. Additionally, the method may include detaching the fuel cell from an adjacent cell within the fuel cell stack assembly by removing a matrix of electrically-conducing protrusions, extending from a first end plate of the fuel cell, from a matrix of electrically-conducing receiving structures positioned within a second endplate of the adjacent cell. The method may further include attaching a replacement fuel cell to the fuel cell stack assembly by inserting a matrix of electrically-conducing protrusions, extending from a third end plate of the replacement fuel cell, into a matrix of electrically-conducing receiving structures positioned within the second endplate of the adjacent cell.

DETAILED DESCRIPTION

Figure 1:
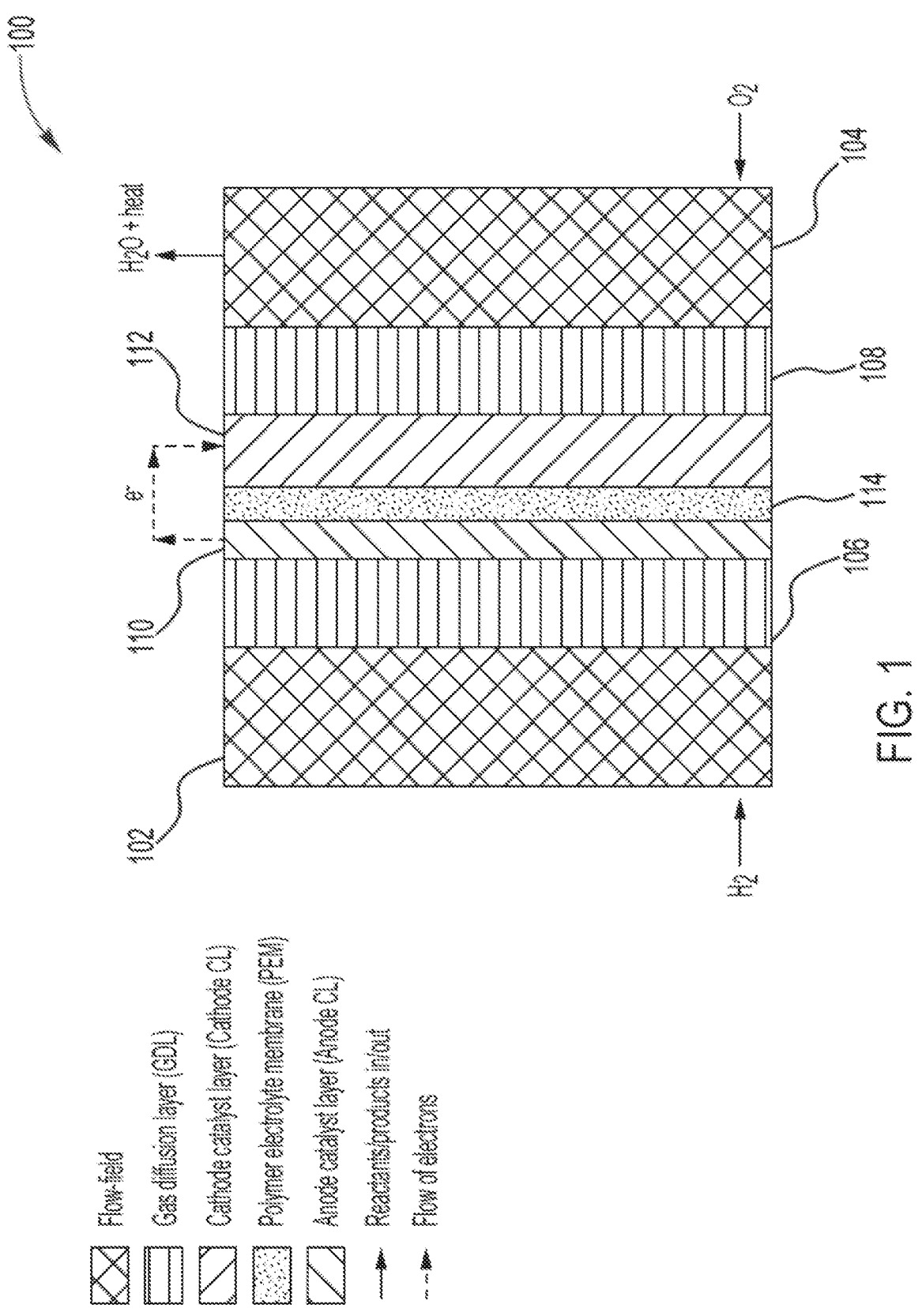
FIG. 1 is a cross-sectional view of common components of an individual fuel cell.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

Fuel cells, such as proton exchange membrane fuel cells (PEMFCs), operate based on a renewable energy carrier (e.g., $H_2$) to deliver energy without emissions of either toxins or green-house gases. In light of this, PEMFCs have positioned themselves as promising alternatives to fossil fuel-based energy sources for a wide range of applications across numerous industries. Chief among these may be the applicability of PEMFCs to the transportation sector including their utility within the automobile industry as high efficiency, high power density, relative light weight, and zero carbon emission energy sources. While such utility has been proven, the widespread use of fuel cells within vehicles has been hampered by high cost and poor repairability characteristics. For example, platinum—which is commonly included in the catalyst layer of both anode and the cathode of the device—is a highly-expensive metal and one of the costliest components of the fuel cell stack. Additionally, existing fuel cell devices are commonly designed as "closed" systems making maintenance both difficult and expensive while also hindering the ability to recycle and recover the stack's costly components such as the precious metal catalyst materials. Accordingly, further development is necessary to support the expanded use of fuel cells, including PEMFCs, within fuel cell vehicles (FCVs).

Given these drawbacks associated with existing fuel cell technology, it would be desirable to provide a fuel cell system that allows for enhanced repairability and recycling potential in order to reduce the overall costs associated with use of fuel cells. Embodiments of the present disclosure describe fuel cell stack designs, systems, and related methods for efficiently monitoring, repairing, and recycling fuel cells and their components. For example, the disclosed embodiments make possible the monitoring and maintenance of individual fuel cells within the fuel cell stack system. Additionally, consistent with certain embodiments herein, if a fuel cell unit fails abruptly or reaches its end-of-life (EOL), it is possible to access each individual fuel cell unit for necessary maintenance and/or replacement. The systems and designs herein also provide for potentially simpler recovery and recycling of cell components including recovery and recycling of the materials used within such components. These systems and designs may provide for enhanced fuel cell efficiency and longer fuel cell lifespans—potentially providing a reduction in the costs associated with existing fuel cell designs and implementations.

A typical single cell—i.e., a building block of a fuel cell stack such as a PEMFC stack—includes a polymer electrolyte membrane (PEM) disposed between anode and cathode catalyst layers (CLs), which are themselves bounded by gas diffusion layers (GDLs). These basic components form the cell's membrane electrode assembly (MEA), which is surrounded by two flow-field plates.

As noted above, platinum (Pt) is commonly used as the chief catalyst in the anode and cathode CLs. At the anode, Pt catalyzes the hydrogen oxidation reaction (HOR, $H_2 \rightarrow 2H^+ + 2e^-$). At the cathode, Pt catalyzes the oxygen reduction reaction (ORR, $\frac{1}{2}O_2 + 2H^+ + 2e^- \rightarrow H_2O$). The required loading of Pt is significantly higher at the cathode than at the anode due to the fact that the kinetics of the ORR are significantly slower than those of the HOR. Furthermore, even when using a loading as low as 0.025 mgPt/cm² at the anode, the HOR can proceed with kinetic losses of less than 20 mV. Alternatively, even when using significantly higher loadings of platinum of 0.1-0.4 mgPt/cm², the ORR's kinetic penalty at currents relevant to operations of FCVs is approximately 400 mV. Finally, during operation of the fuel cell, both at the anode and the cathode, Pt may undergo further degradation, which further increases the kinetic overpotentials experienced by the system throughout its lifetime.

FIG. 1 is a cross-sectional view of common components of a single fuel cell 100, which also generally depicts the reactants and products of the cell's operation. As shown in the figure, two end plates 102 and 104 are positioned at opposite ends of cell 100 and surround two gas diffusion layers 106 and 108. End plates 102 and 104 may be, for example, bipolar plates or flow-field plates. An anode catalyst layer 110 and a cathode catalyst layer 112 are positioned between GDLs 106 and 108 and may be separated by a polymer electrolyte membrane (PEM) 114. The hydrogen and oxygen reactants are introduced into the cell through the opposing flow fields and current flows from the anode to the cathode resulting in the production of $H_2O$ and heat.

In one or more embodiments, fuel cell 100 may be a PEMFC. A PEMFC includes a proton exchange membrane, which may also be referred to as a polymer electrolyte membrane (PEM). A membrane electrode assembly (MEA) refers to the membrane, electrodes and may refer to a catalyst or catalyst layer. The catalyst layers may include carbon paper or a carbon support. In one or more embodiments, the MEA may include a gas diffusion layer. Proton exchange membrane fuel cells commonly operate in acidic environments and may have increased operating temperatures. For example, a PEMFC may operate between about −20 and 100° C.

In one or more embodiments, a PEM may include Nafion XL, Nafion 112, Nafion 115, Nafion 117, and/or Nafion 1110. Nafion membranes may include a fluoropolymer. Electrodes may be made of carbon, carbon cloth and/or carbon fiber. Electrodes may include a catalyst. Catalysts may include but are not limited to platinum, nickel, palladium, and iridium. As just one non-limiting example, platinum ruthenium on a carbon support may be used as the electrode catalyst later.

A core component of a PEMFC is the membrane-electrode assembly (MEA), which assists the electrochemical reaction within the stack. The MEA includes a PEM through which protons are transferred. As noted above, PEMs commonly comprise polymer-based electrolyte materials such as Nafion. In addition to a PEM, the MEA may also include other subcomponents such as electrodes and catalysts as already described in connection with FIG. 1. Within the MEA, protons are transferred from an anode to a cathode through a PEM and its associated polymer electrolyte. The electrodes may be made of any suitable material and may be heat pressed onto the PEM within the MEA. The anode and cathode electrodes also commonly contain a catalyst layer comprising Pt or another Pt-group metal such as ruthenium. In addition to the MEA and its various subcomponents, a PEMFC also typically includes other components such as current collectors, GDLs, gaskets, and at least one bipolar plate (BPP).

Figures 2A, 2B:
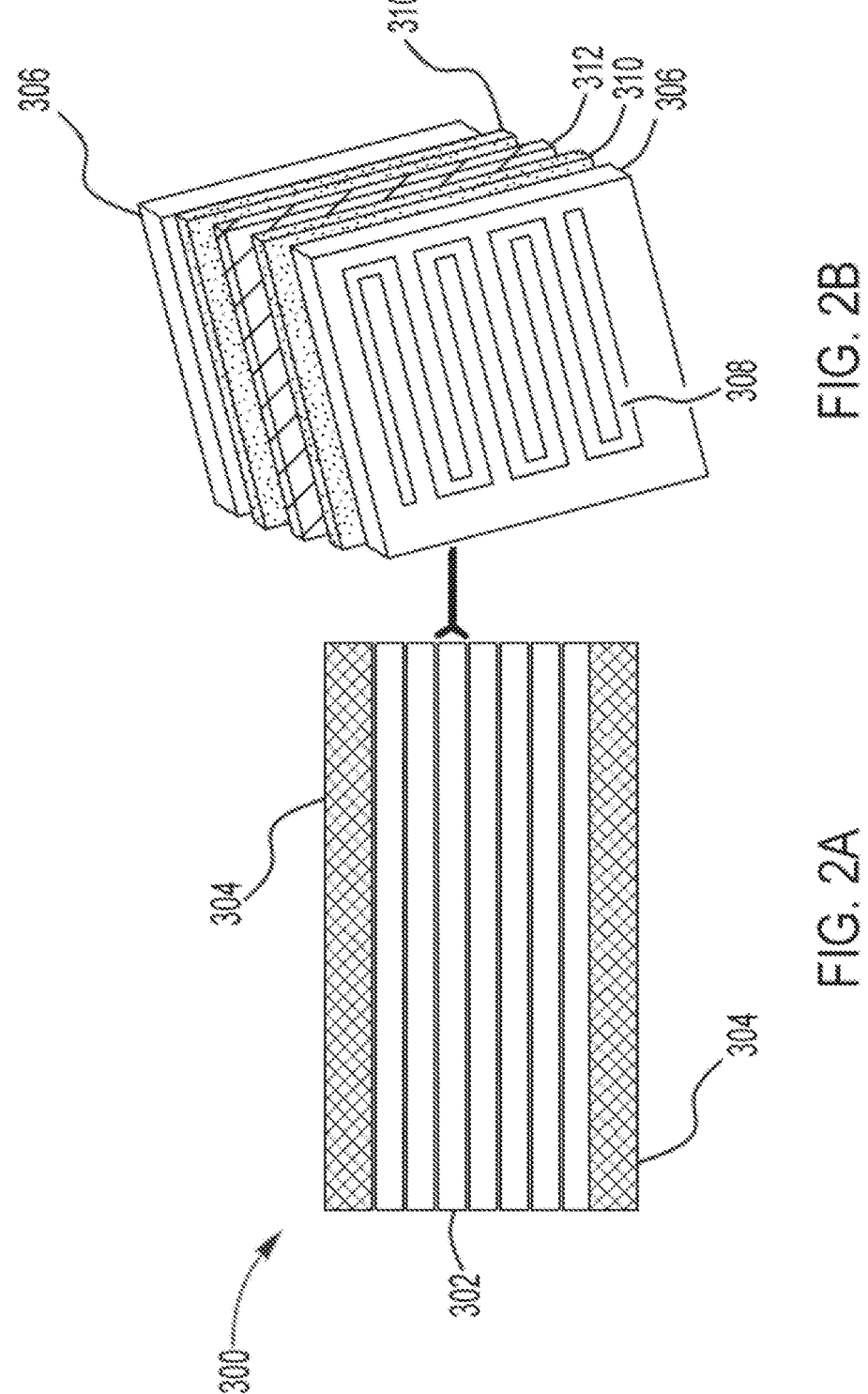
FIGS. 2A and 2B respectively depict a general side view of a fuel cell stack assembly and a perspective schematic view of an individual fuel cell.

FIG. 2A is a general side view of a fuel cell stack assembly 300. Fuel cell stack 300 may be connected to an external circuit to provide power. Fuel cell stack 300 generally comprises a plurality of fuel cells 302 arranged between two fuel cell stack end plates 304. FIG. 2B is a schematic perspective view of an individual fuel cell 302. As shown in FIG. 2B, each fuel cell 302 may include subcomponents such as the those described above. Namely, individual fuel cell 302 may include BPPs 306 having flow channels 308. Flow channels 308 may assist in supplying fuel and/or removing by-products from the fuel cell 302. Fuel cell 302 further includes anode and cathode catalyst layers (CLs) 310 positioned between BPPs 306 and separated by PEM 312.

Bipolar plates may provide structural support, conductivity, and may assist in supplying fuel. Bipolar plates may also assist in removal of reaction products or byproducts. Bipolar plates may help regulate or manage thermal conditions in a fuel cell. Typically, bipolar plates may be made of metal or graphite and may include a coating, composite, and/or polymer. In one or more embodiments, the bipolar plates of the fuel cell may be flow-field plates. In one or more embodiments, a fuel cell may include one or more gas diffusion layers. Bipolar plates may connect and divide individual fuel cells within a fuel cell stack. Fuel cells may be stacked to increase voltage and/or power.

As can be seen in FIG. 2A, the fuel cell stack assembly includes a plurality of individual fuel cells aligned in series so as to create a repeating unit of cells connected at their respective end plates, which may be bipolar plates. Depending on their specific application, fuel cell stacks can include between 2 and 1,500 individual fuel cells. In connection with FCVs, stacks of between 100 and 500 fuel cells may be assembled. In other applications, the fuel cell stack may include between 10 and 100 individual fuel cells. In still other applications, the fuel cell stack may include between 200 and 1,000 individual fuel cells.

Once a fuel cell stack is assembled and sealed, it is commonly difficult to disassemble the stack to access any of the individual fuel cell units without disrupting the entire system. In addition to the closed nature of the stack assembly, individual fuel cell units regularly degrade at different rates and may fail or otherwise reach their end-of-life (EOL) states at different times due to harsh fuel cell operating conditions—e.g., acidic environment of pH between 1 and 4—and inhomogeneous parameters—e.g., pressure, temperature, and/or humidity—across a fuel cell stack. Despite the non-uniform degradation of individual cells, existing fuel cell stack assemblies are not well-suited for individual, cell-level repair. Moreover, existing fuel cell management systems are not well-equipped to monitor and detect faults or degraded performance at the individual cell-level. These realities increase the costs associated with fuel cell technology because, in contrast to efficient and cost-effective repair of a specific cell or group of cells in the event of fault or failure, the entire fuel cell stack assembly is commonly replaced when cell-level faults begin to impact overall system performance—even in cases where many (or most) of the individual cells remain in good health.

It would accordingly be advantageous to have fuel cell stack designs that enable disassembly and replacement of individual cells, or groups of individual cells, without the need to replace the entire fuel cell stack. Additionally, it would be advantageous to employ systems and methods for monitoring and identifying faults within individual cells, or within groups of individual cells, in order to increase performance over the life of a fuel cell stack.

In one or more embodiments, fuel cells incorporating end plates having electrically-conducting tube and socket structures are described. Such structures can be more generally described as a matrix of protrusions and corresponding receiving structures. In accordance with such embodiments, tubes (or other protrusions) may be embedded into and extend from the surface of the end plate/BPP of a first fuel cell and configured to be received by sockets (or other receiving structures) contained within (or formed within) the end plate/BPP of an adjoining second fuel cell. This protrusion matrix (e.g., tube and socket) configuration allows for stack assemblies to be constructed in which individual cells (or groups of cells) may be easily removed from the assembly and replaced, thereby extending the lifetime of the larger stack assembly. In accordance with certain embodiments, a given fuel cell end plate/BPP may include both tube and socket structures configured to receive or otherwise engage respective socket and tube structures included in an adjoining end plate/BPP within the fuel cell stack.

In accordance with certain other embodiments, fuel cell management systems and methods for monitoring and identifying faults within individual cells (or within groups of cells) are described. These systems and methods may provide for better performance over the life of a fuel cell stack by allowing for faults to be identified and addressed without resorting to complete stack decommission and/or replacement.

Figure 3:
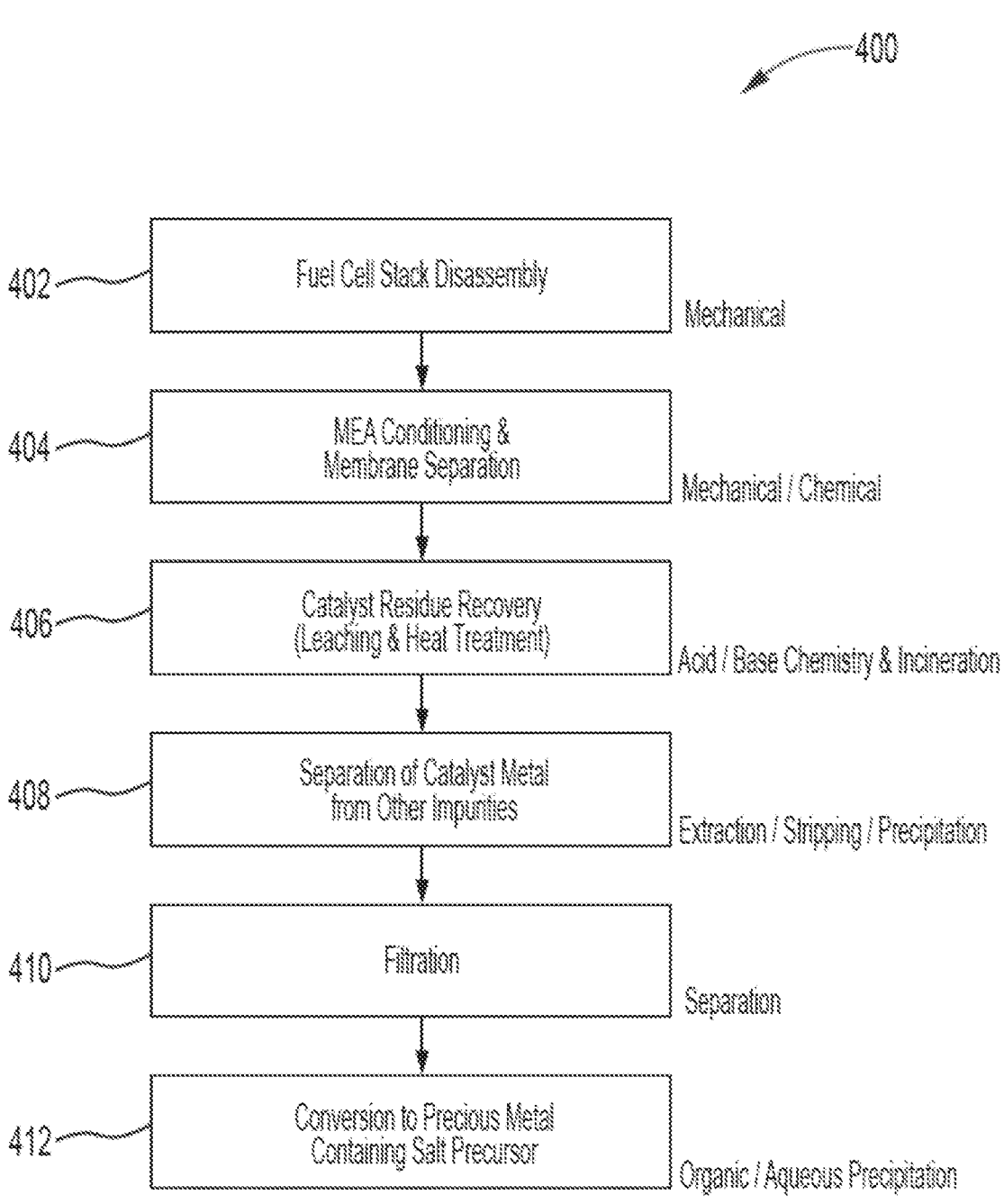
FIG. 3 is a flowchart describing a process for recovering and recycling catalyst material from fuel cell stacks.

FIG. 3 is a flowchart describing a process 400 for recovering and recycling catalyst material from a fuel cell stack. Once the fuel cell stack reaches its end-of-life stage, process 400 begins with the mechanical disassembly of the fuel cell stack as shown in step 402. During this step, the entire fuel cell stack assembly may be dismantled to recover precious materials such as Pt catalyst. In accordance with one or more embodiments described herein, however, individual fuel cells within the stack may be removed and replaced extending the lifetime of the larger stack assembly. In accordance with such embodiments, step 402 may not require complete fuel cell disassembly in order to begin the recycling process in connection with individual cells or groups of cells removed from the stack. Instead, individual cells, groups of cells, and/or other components of the stack may be removed and the remaining steps of the recycling and recovery process may be carried out in connection with only those components removed from the stack. Whether complete or partial, the disassembly step 402 includes mechanically dismantling the stack components. This may include separating bipolar plates and membrane electrode assemblies (MEAs). Following step 402, the membrane may be separated from the MEA unit in step 404. Next, catalyst residues may be recovered via acid and/or base leaching followed by the heat treatment in step 406. The precious catalyst metals (or other materials selected for recovery from the stack/cell) may then be separated from impurities through known processes such as extraction, stripping, and/or precipitation in step 408 followed by filtration in step 410. Finally, in step 412, the precious catalyst metals (or other materials selected for recovery from the stack/cell) may be chemically converted to a salt (e.g., $(NH_4)_2PtCl_6$) that may be used to as a precursor material to prepare new catalyst materials for use in other fuel cells or fuel cell stack assemblies.

Figure 4A:
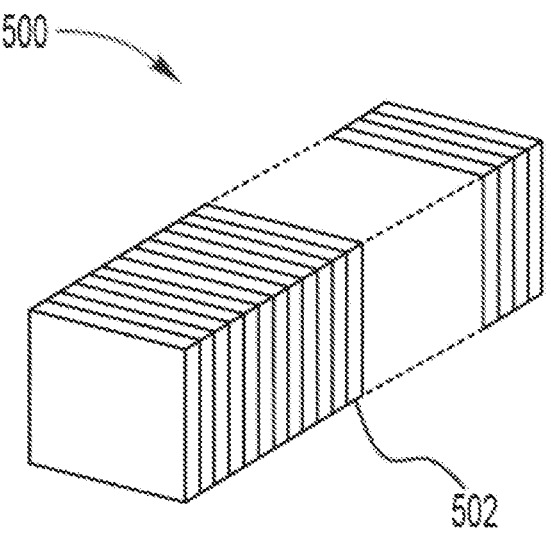
FIGS. 4A through 4D are general views of proton exchange membrane fuel cell stacks and components of fuel cell stacks in accordance with certain embodiments.
Figure 4B:
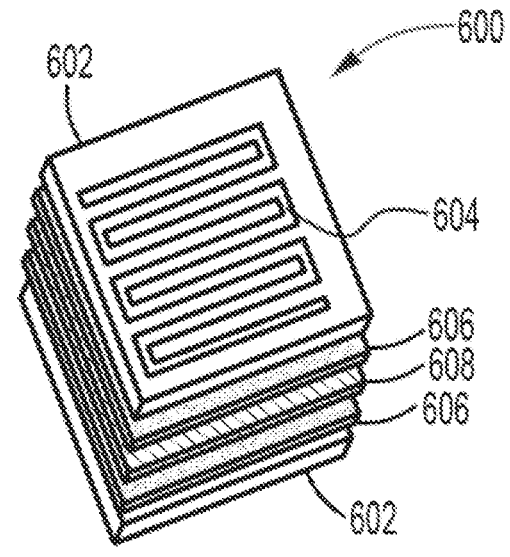

FIGS. 4A through 4D depict a non-limiting example of a fuel cell stack assembly comprising individual unit cells, which incorporate a matrix of protrusions and corresponding receptacles in accordance with one or more embodiments. By constructing a fuel cell stack from individual cells or groups of cells having structures configured to protrude from a first endplate/BPP and be received by an adjoining second endplate/BPP may allow for simpler stack disassembly and may also facilitate removal and replacement of stack components prior to the stack's own end-of-life. FIG. 4A shows a perspective view of a fuel cell stack assembly 500 including a plurality of individual fuel cells 502 commonly arranged between two fuel cell stack end plates. Each individual fuel cell 502 may include a number of subcomponents such as those previously described herein. FIG. 4B is a schematic perspective view of an individual fuel cell 600. As shown in FIG. 4B, fuel cell 600 includes endplates/BPPs 602 having flow channels 604. Flow channels 604 may assist in supplying fuel and/or removing by-products from the fuel cell 600. Fuel cell 600 further includes anode and cathode catalyst layers (CLs) 606 positioned between endplates/BPPs 602 and separated by PEM 608.

Figure 4C:
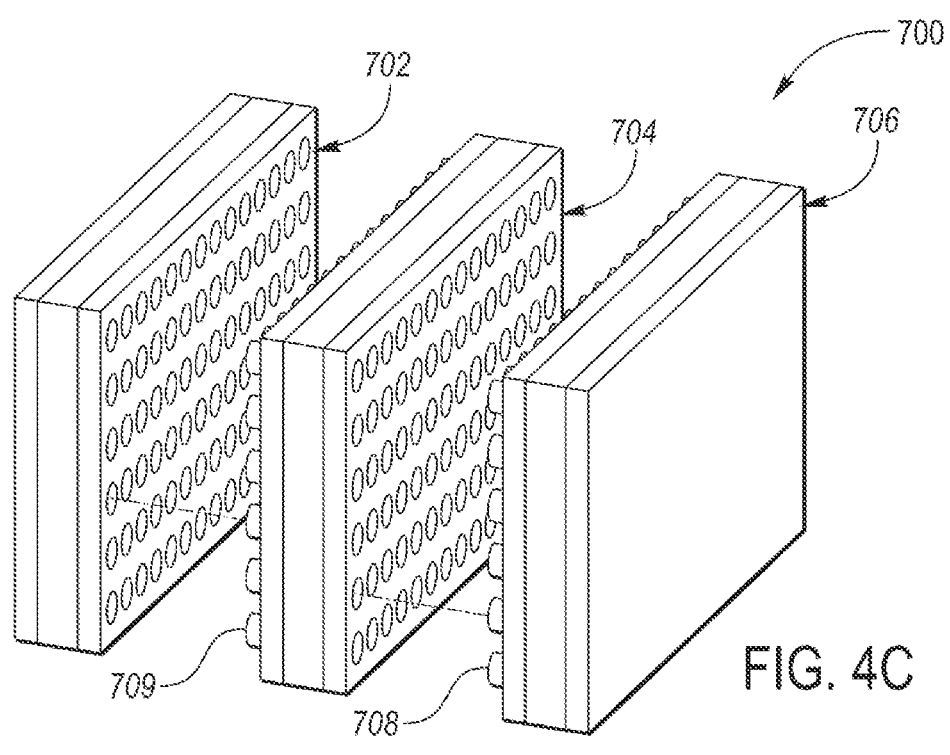
Figure 4D:
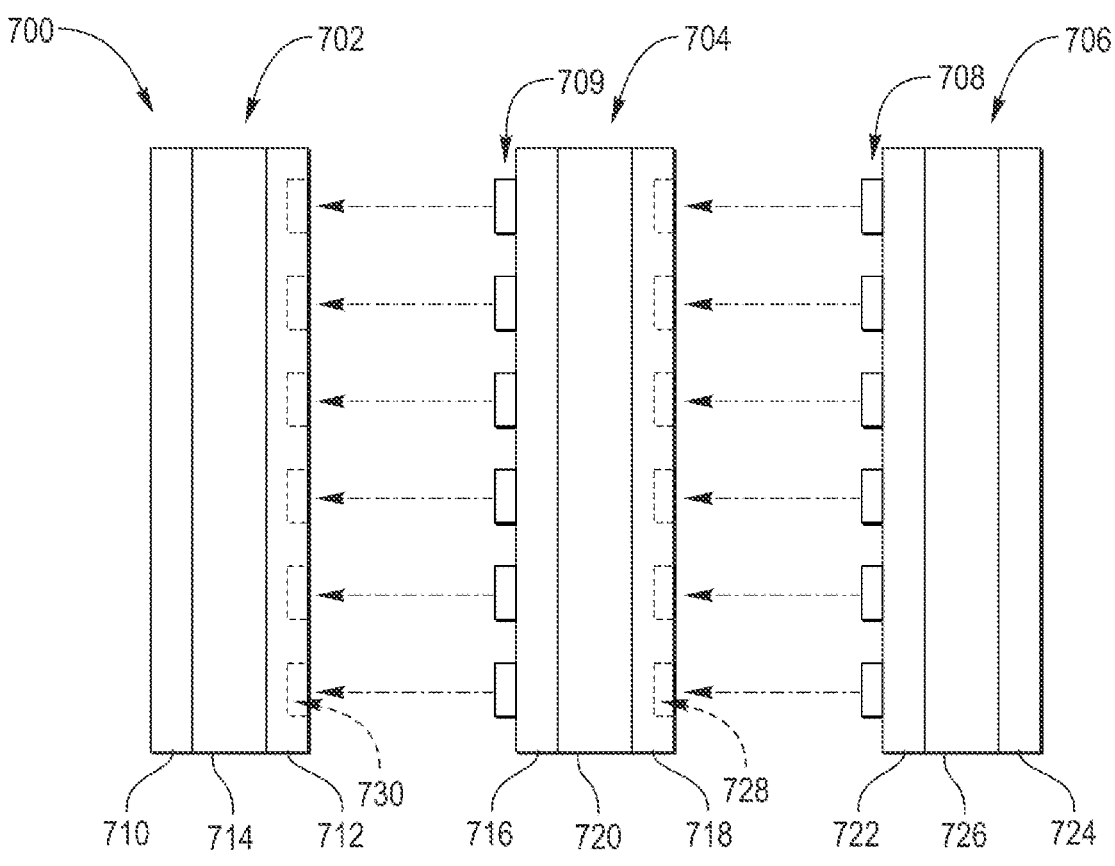

FIG. 4C depicts a perspective view of a set of fuel cells 700. FIG. 4D depicts a side view of the set of fuel cells 700. Set of fuel cells 700 include individual fuel cells 702, 704, and 706. Fuel cell 702 includes first and second flow field plates 710 and 712 and MEA 714 therebetween. Fuel cell 704 includes first and second flow field plates 716 and 718 and MEA 720 therebetween. Fuel cell 706 includes first and second flow field plates 722 and 724 and MEA 726 therebetween. First flow field plate 722 of fuel cell 706 includes a matrix of electrically-conducting tubes 708. First flow field plate 716 of fuel cell 704 includes a matrix of electrically-conducting tubes 709 (or other protrusions) extending from first flow field plate 716. Second flow field plate 718 of fuel cell 706 includes a matrix of electrically-conducting sockets 728 (or other receiving structures) configured to receive the matrix of electrically-conducting tubes 708 adjoining fuel cell 706. Second flow field plate 712 of fuel cell 702 includes a matrix of electrically-conducting sockets 730 configured to receive the matrix of electrically-conducting tubes 709 of adjoining fuel cell 704.

The connecting-structure matrix configuration described herein allows different fuel cells to be electrically connected and stacked in a modular fashion without increasing—or significantly increasing—the electrical resistance between each fuel cell unit. Avoiding such resistance between the individual fuel cells helps to reduce the risk of overpotential within individual cells or groups of cells.

Although generally described herein as "tubes" and "sockets," the connecting structures may be of any shape or configuration allowing for adjoining cell end plates/BPPs to be electrically joined. Any matrix of protrusions configured to be received by a corresponding receiving structure can be applied in accordance with one or more embodiments. Such a configuration can also comprise any number of protrusions including, but not limited to, a 2×2 matrix, a 10×10 matrix, a 100×100 matrix, or a 1,000×1,000 matrix for example. Moreover, the matrix of protrusions need not contain an equal number of rows and columns, for example. Similarly, the matrix or plurality of receiving structures need not contain an equal number of rows and columns, for example. Some examples of possible protrusions and receiving structures in accordance with certain embodiments may include rectangular-shaped protrusions and receptacles. In accordance with other embodiments, the structures may be respectively characterized by mound and receiving-dimple shapes, for example. Additionally, in one or more embodiments, the protrusions may comprise wires extending from the end plate/BPP that are received by wire receptacles within an adjoining cell end plate/BPP. Such wires may comprise any suitable material including, but not limited to, Cu, steel, or Ni, for example.

Moreover, the size of the cell-connecting structures can vary depending on the application as different applications will present different power requirements and have different stack tolerances. In some embodiments for example, the connecting tubes may extend anywhere from 0.01 mm to 2 mm from the surface of the endplate. According to other embodiments, their length—measured from the surface of the endplate—may be between 0.05 mm and 0.15 mm or between 0.5 mm and 1.5 mm. In still other embodiments, the connecting tubes may extend from 2 mm to 2 cm from the surface of the endplate. In accordance with one or more embodiments, the length of the receiving sockets may be between 0.01 mm and 2 mm, 0.05 mm and 0.15 mm, or 0.5 mm and 1.5 mm. In accordance with other embodiments, the length of the receiving sockets may be between 2 mm and 2 cm.

The cell-connecting structures described herein may be formed of any suitable materials. The structures are preferably formed of highly-conductive materials such as metals, metal alloys, and/or conducting oxides. Examples of such materials may include Cu, steel, Ni, or other metals/metal alloys comprising d-block elements. Additional materials may include other alloys of stainless steel and aluminum, for example. In accordance with certain embodiments, the connecting tubes and sockets may be formed of the same material used to form the endplate/BPP, which is commonly graphite, stainless steel, Ti, Al, or other alloys thereof. The connecting structures may also be coated with protective oxide (e.g., $TiO_2$, $TiO_x$, $MgTi_2O_{5-x}$, $SnO_2$, $SnTiO_x$) and/or nitride (TiN, ZrN, VN, etc.) materials in order to provide protection against the harsh acidic conditions of the polymer exchange membrane fuel cell.

In one or more embodiments, the electrical conductivity of BPPs having the cell-connecting structures described herein may be greater than 100 S/cm. In one or more embodiments, the electrical conductivity may be from 0.1 to 100 S/cm. In one or more embodiments, the BPPs may be provided with a coating layer that may have a greater electrical conductivity than the substrate the bulk material of the BPP. In one or more embodiments, such a surface layer coating may have an electrical conductivity greater than 100 S/cm. In one or more embodiments, the surface layer coating may have an electrical conductivity from 0.1 to 100 S/cm. In one or more embodiments, an alloy may be applied to a substrate to obtain these conductivity properties.

Embodiments described herein provide for a number of advantages over existing fuel cell and fuel cell stack designs. For example, in accordance with certain embodiments, end-of-life fuel cell units may be replaced with a new fuel cell units without requiring replacement of the entire stack assembly. Additionally, stack designs that allow for the removal of individual fuel cell units—or for the removal of groups of fuel cells that amount to less than the entire fuel cell stack assembly—may provide for more effective materials recycling, cell-level monitoring, maintenance, and management.

Figure 5:
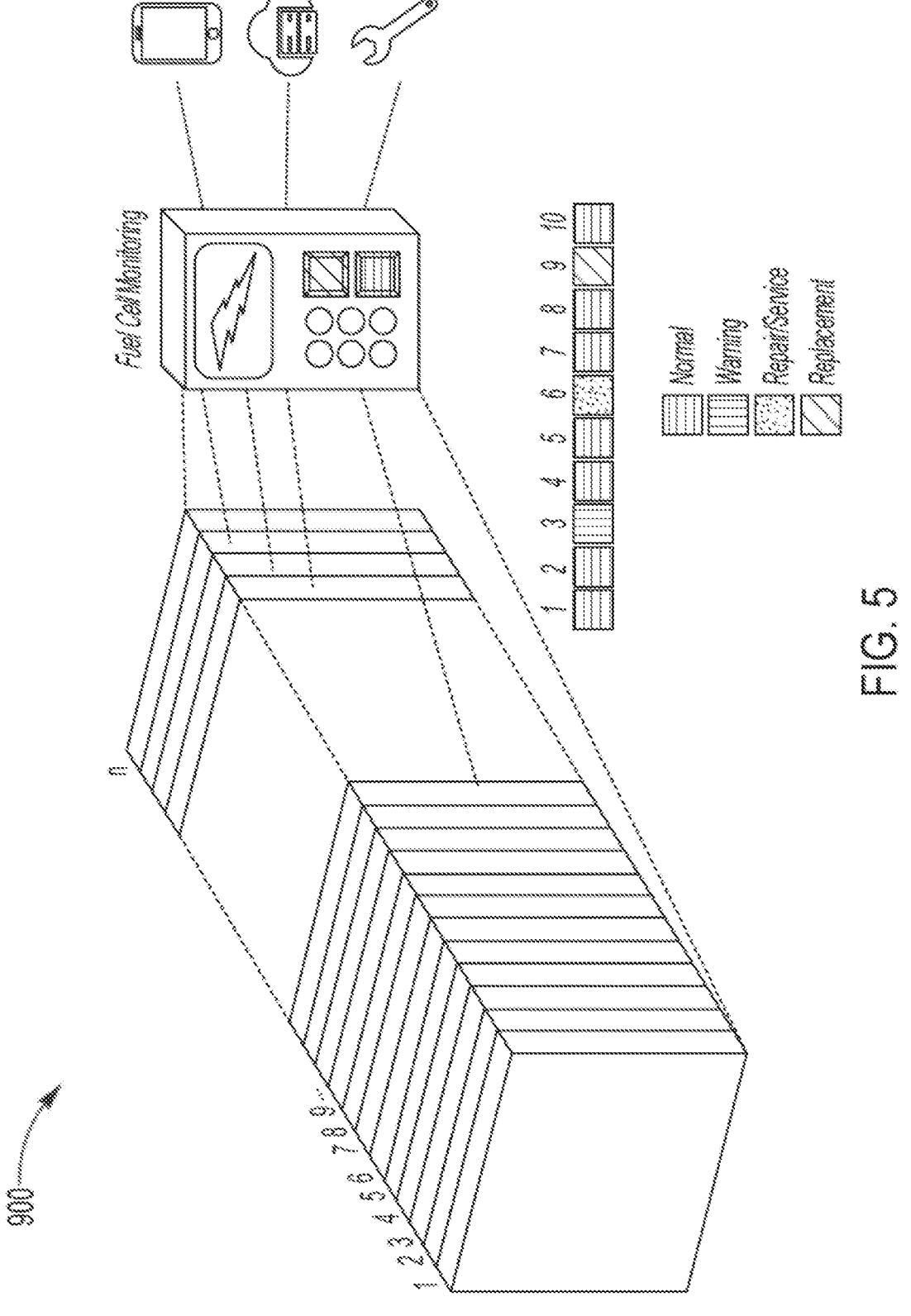
FIG. 5 is a diagram showing the general structure of a fuel cell monitoring system in accordance with one or more embodiments.

FIG. 5 is a diagram showing the general structure of a fuel cell monitoring system 900 in accordance with one or more embodiments. As shown in FIG. 5, a fuel cell stack comprising a plurality of individual fuel cells 902 is monitored at the cell-level by a fuel cell management system. Sensors within the fuel cell stack can provide information regarding the operating conditions and parameters of individual fuel cells, which can then be used to determine the state of health of the individual fuel cells. The fuel cell management system can then make such information available to consumers and/or technicians capable of repairing the fuel cell stack assembly. Software associated with the fuel cell management system may also notify the customer/technician via e-mail or mobile applications.

In a non-limiting example, one or more fuel cell management system algorithms may be used to monitor, detect, predict, identify, and/or respond to faults within individual fuel cells, or within groups of individual fuel cells. Additionally, embodiments disclosed herein allow for the individual fuel cells or groups of cells to be replaced without require complete disassembly of the fuel cell stack.

In accordance with to various embodiments, a method of monitoring and replacing fuel cells within a fuel cell stack assembly is disclosed. The method may include measuring, using one or more sensors in communication with a fuel cell monitoring system, one or more operating conditions of a fuel cell within the fuel cell stack assembly. The method may further include determining, using a processor, a state of health of the fuel cell based at least in part on the one or more operating conditions and sending a notification regarding the state of health of the fuel cell to one or more recipients or recipient systems. Additionally, the method may include detaching the fuel cell from an adjacent cell within the fuel cell stack assembly by removing a matrix of electrically-conducing protrusions, extending from a first end plate of the fuel cell, from a matrix of electrically-conducing receiving structures positioned within a second endplate of the adjacent cell. The method may further include attaching a replacement fuel cell within the fuel cell stack assembly by inserting a matrix of electrically-conducing protrusions, extending from a third end plate of the replacement fuel cell, into a matrix of electrically-conducing receiving structures positioned within the second endplate of the adjacent cell.

Embodiments described above, including aspects and combinations thereof, may be incorporated into fuel cell management systems comprising a processor and a memory for storing machine instructions that can be executed by the processor. Such management systems may be communicatively coupled to one or more fuel cells or fuel cell stacks, which may be PEMFCs. Such fuel cell management systems may also be communicatively coupled to one or more sensors configured to measure certain fuel cell-related parameters such as, but not limited to, voltage, current, pressure, resistance, humidity, pH, and temperature. The disclosed fuel cell management systems may include, for example, a microcontroller having memory and input/output components on a single, integrated chip or within a single housing. Alternatively, the disclosed management systems may include separate processor, memory, and input/output components. The processor may be a commercially-available processing unit that implements an instruction set such as one of the x86, ARM, Power, or MIPS instruction set families. During operation, the processor may execute stored program instructions that are retrieved from the memory. The memory may include volatile memory and non-volatile memory for storing instructions and data. The non-volatile memory may include solid-state memory units, such as NAND flash memory, magnetic and optical storage media, or any other suitable data storage device that retains data. The volatile memory may include any suitable static or dynamic random-access memory (RAM) that stores program instructions and data.

The fuel cell management system algorithms described herein may be implemented using a computer platform that includes, without limitation, a processor, memory, and non-volatile storage. The processor may include one or more devices selected from high-performance computing systems including high-performance cores, microprocessors, microcontrollers, digital signal processors, microcomputers, central processing units, field programmable gate arrays, programmable logic devices, state machines, logic circuits, analog circuits, digital circuits, or any other device that manipulate signals (analog or digital) based on computer-executable instructions residing in the memory. The memory may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage may include one or more persistent data storage devices such as a hard drive, optical drive, tape drive, non-volatile solid state device, cloud storage or any other device capable of persistently storing information.

The processor may be configured to read into memory and execute computer-executable instructions of the non-volatile storage and embodying one or more of the algorithms described herein. Executable instructions may reside in a software module. The software module may include operating systems and/or applications and may be compiled or interpreted from a computer program created using a variety of programming languages and/or technologies, including, without limitation, and either alone or in combination, Java, C, C++, C#, Objective C, Fortran, Pascal, Java Script, Python, Perl, and PL/SQL. Upon execution by the processor, the computer-executable instruction of the software module may cause the computing platform to implement one or more of the algorithms disclosed herein. Non-volatile storage may also include data supporting the functions, features, calculations, and processes.

The program code embodying the algorithms described herein is capable of being individually or collectively distributed as a program product in a variety of different form. The program code may be distributed using a computer readable storage medium having computer readable program instructions thereon for causing a processor to carry out aspects. Computer readable storage media, which is inherently non-transitory, may include volatile or non-volatile, and removable and non-removeable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device form of a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement functions, acts, and/or operations described herein. The functions, acts, and/or operations described herein may be re-ordered, processed serially, and/or processed concurrently.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of replacing fuel cells within a fuel cell stack assembly, the method comprising:

detaching a fuel cell from an adjacent cell within the fuel cell stack assembly by removing a first electrically-conducing mating tubes matrix on a first endplate of the fuel cell from a second electrically-conducing mating sockets matrix on a second endplate of the adjacent cell, elements of the first electrically-conducting mating tubes matrix positioned about an edge region of the first endplate and a middle region of the first endplate within the edge region of the first endplate, and elements of the second electrically-conducting mating sockets matrix positioned about an edge region of the second endplate and a middle region of the second endplate within the edge region of the second endplate; and attaching a replacement fuel cell to the fuel cell stack assembly by mating a third electrically-conducing mating tubes matrix on a third endplate of the replacement fuel cell with the second electrically-conducing mating sockets matrix on the second endplate of the adjacent cell, elements of the third electrically-conducting mating tubes matrix positioned about an edge region of the third endplate and a middle region of the third endplate within the edge region of the third endplate.

2. The method of claim 1, wherein the first electrically-conducting mating tubes matrix includes one or more rows and columns of mating structures.

3. The method of claim 2, wherein the one or more rows of mating structures includes first, second, third, and fourth corner mating structures.

4. The method of claim 3, wherein a first diagonal line of mating structures extends between the first and fourth corner mating structures, and a second diagonal line of mating structures extends between the second and third mating structures.

5. The method of claim 4, wherein the first and second diagonal lines of mating structures intersect.

6. The method of claim 3, wherein a first horizontal line of mating structures extends between the first and second corner mating structures, and a second horizontal line of mating structures extends between the third and further corner mating structures.

7. The method of claim 1, wherein detaching the fuel cell from an adjacent cell within the fuel cell stack assembly comprises detaching additional fuel cells from the stack assembly.

8. The method of claim 1, wherein attaching a replacement fuel cell within the fuel cell stack assembly comprises attaching additional fuel cells to the stack assembly.

9. A method of replacing fuel cells within a fuel cell stack assembly, the method comprising:

detaching a fuel cell from an adjacent cell within the fuel cell stack assembly by removing a first electrically-conducing mating rectangular-shaped protrusions matrix associated with a first endplate of the fuel cell from a second electrically-conducing mating rectangular-shaped receiving structures matrix associated with a second endplate of the adjacent cell, elements of the first electrically-conducting mating rectangular-shaped protrusions matrix positioned about an edge region of the first endplate and a middle region of the first endplate within the edge region of the first endplate, and elements of the second electrically-conducting mating rectangular-shaped receiving structures matrix positioned about an edge region of the second endplate and a middle region of the second endplate within the edge region of the second endplate; and attaching a replacement fuel cell to the fuel cell stack assembly by mating a third electrically-conducing mating rectangular-shaped protrusions matrix associated with a third endplate of the replacement fuel cell with the second electrically-conducing mating rectangular-shaped receiving structures matrix associated with the second endplate of the adjacent cell, elements of the third electrically-conducting mating rectangular-shaped protrusions matrix positioned about an edge region of the third endplate and a middle region of the third endplate within the edge region of the third endplate.

10. The method of claim 9, wherein detaching the fuel cell from an adjacent cell within the fuel cell stack assembly comprises detaching additional fuel cells from the stack assembly.

11. The method of claim 9, wherein attaching a replacement fuel cell within the fuel cell stack assembly comprises attaching additional fuel cells to the stack assembly.

12. The method of claim 9, wherein the first electrically-conducing mating rectangular-shaped protrusions matrix includes one or more rows and columns of mating structures.

13. The method of claim 12, wherein the one or more rows of mating structures includes first, second, third, and fourth corner mating structures.

14. A method of replacing fuel cells within a fuel cell stack assembly, the method comprising:

detaching a fuel cell from an adjacent cell within the fuel cell stack assembly by removing a first matrix of electrically-conducing wire protrusions, extending from a first endplate of the fuel cell, from a second matrix of electrically-conducing wire receptacles positioned within a second endplate of the adjacent cell, elements of the first matrix positioned about an edge region of the first endplate and a middle region of the first endplate within the edge region of the first endplate, and elements of the second matrix positioned about an edge region of the second endplate and a middle region of the second endplate within the edge region of the second endplate; and attaching a replacement fuel cell to the fuel cell stack assembly by inserting a third matrix of electrically-conducing wire protrusions, extending from a third endplate of the replacement fuel cell, into the second matrix of electrically-conducing wire receptacles positioned within the second endplate of the adjacent cell, elements of the third matrix positioned about an edge region of the third endplate and a middle region of the third endplate within the edge region of the third endplate.

15. The method of claim 14, wherein detaching the fuel cell from an adjacent cell within the fuel cell stack assembly comprises detaching additional fuel cells from the stack assembly.

16. The method of claim 14, wherein attaching a replacement fuel cell within the fuel cell stack assembly comprises attaching additional fuel cells to the stack assembly.

17. The method of claim 14, wherein the first matrix includes one or more rows and columns of electrically-conducting wire protrusions.

18. The method of claim 17, wherein the one or more rows and columns include two or more rows and columns.

19. The method of claim 14, wherein the second matrix includes one or more rows and columns of electrically-conducing wire receptacles.

* * * * *